(12) United States Patent
Xiong et al.

(10) Patent No.: US 10,717,188 B2
(45) Date of Patent: Jul. 21, 2020

(54) SPATIAL CROSS-AXIS TRANSMISSION MECHANISM AND ROBOT HAVING THE SAME

(71) Applicant: UBTECH Robotics Corp, Shenzhen (CN)

(72) Inventors: Youjun Xiong, Shenzhen (CN); Kunlei Zhao, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 226 days.

(21) Appl. No.: 16/114,220

(22) Filed: Aug. 28, 2018

(65) Prior Publication Data

US 2019/0160657 A1 May 30, 2019

(30) Foreign Application Priority Data

Nov. 28, 2017 (CN) .......................... 2017 1 1219513

(51) Int. Cl.
| | | |
|---|---|---|
| *B25J 17/00* | (2006.01) | |
| *B25J 17/02* | (2006.01) | |
| *B25J 18/00* | (2006.01) | |
| *B25J 9/10* | (2006.01) | |
| *F16H 55/22* | (2006.01) | |
| *F16H 1/12* | (2006.01) | |
| *B25J 9/00* | (2006.01) | |

(52) U.S. Cl.
CPC ............... *B25J 9/10* (2013.01); *B25J 9/0009* (2013.01); *B25J 17/00* (2013.01); *F16H 1/12* (2013.01); *F16H 55/22* (2013.01)

(58) Field of Classification Search
CPC ......... B60R 1/068; B60R 1/072; B60R 1/066; B25J 9/10; B25J 9/0009; B25J 17/00; B25J 9/0054; B25J 9/0057; F16H 1/12; F16H 55/22; F16H 25/04; F16H 25/02; F16H 25/00
See application file for complete search history.

(56) References Cited

U.S. PATENT DOCUMENTS

| | | | | |
|---|---|---|---|---|
| 3,554,049 A | * | 1/1971 | Holmes .................. | B60R 1/068 74/502.1 |
| 5,070,572 A | * | 12/1991 | Kuhbauch ................ | B60S 1/24 15/250.13 |
| 9,027,423 B1 | * | 5/2015 | Cui ........................ | F16H 25/20 74/53 |
| 2015/0122060 A1 | * | 5/2015 | Cui ........................ | F16H 25/14 74/89 |

\* cited by examiner

*Primary Examiner* — Jake Cook

(57) ABSTRACT

A spatial crossed-axis transmission mechanism includes a rotatable driving member, an actuating member, and a support member for fixing the driving member and the actuating member. The driving member comprises a first end surface adjacent to the support member, and an Archimedes spiral groove is defined in the first end surface of the driving member. The actuating member includes an end surf adjacent to the support member and a sliding shaft on the end surface of the actuating member. The support member defines a straight groove passing therethrough, and the sliding shaft comprises an end that extends through the straight groove and fits into the Archimedes spiral groove.

10 Claims, 6 Drawing Sheets

SPATIAL CROSS-AXIS TRANSMISSION MECHANISM AND ROBOT HAVING THE SAME

CROSS REFERENCE TO RELATED APPLICATIONS

This application claims priority to Chinese Patent Application No. 201711219513.1, filed Nov. 28, 2017, which is hereby incorporated by reference herein as if set forth in its entirety.

BACKGROUND

1. Technical Field

The present disclosure generally relates to mechanical transmission devices, and particularly to a spatial cross-axis transmission mechanism and a robot.

2. Description of Related Art

As technology advances, micro machines are being increasingly used on a variety of devices. Micromechanical transmission is a key part of a micro machine. One of the micromechanical transmission devices, i.e., cross-axis type transmission devices are not commonly used. Conventional cross-axis transmission devices, such as couplings and universal joints, are complex, which limits their application and is not suitable for use in micro product systems. Furthermore, due to the complex structure of these devices, they are inconvenient to be manufactured, high in cost, and do not have high reliability.

BRIEF DESCRIPTION OF THE DRAWINGS

Many aspects of the present embodiments can be better understood with reference, to the following drawings. The components in the drawings are not necessarily drawn to scale, the emphasis instead being placed upon clearly illustrating the principles of the present embodiments. Moreover, in the drawings, all the views are schematic, and like reference numerals designate corresponding pans throughout the several views.

DETAILED DESCRIPTION

Figure 1:
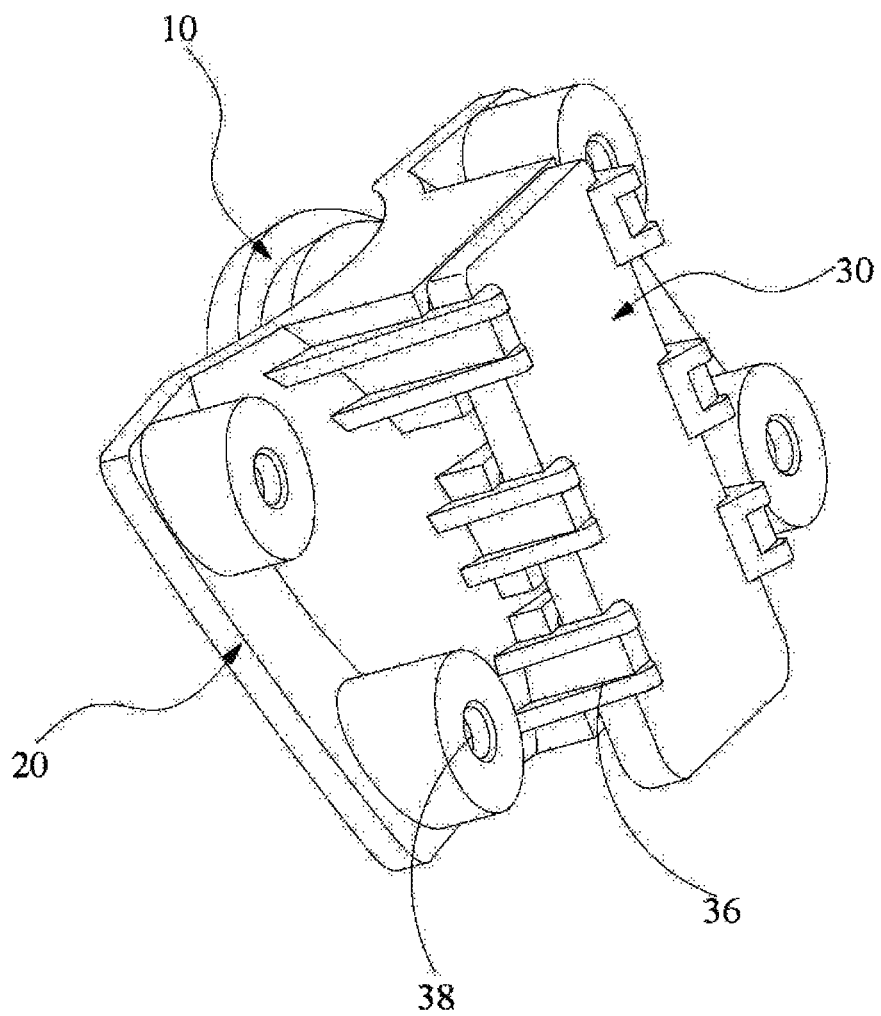
FIG. 1 is an isometric view of a spatial cross-axis transmission mechanism according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", indicating the orientational or positional relationship based on the orientational or positional relationship shown in the drawings, are merely for convenience of description, but are not intended to indicate or imply that the device or elements must have a particular orientation or be constructed and operated in a particular orientation and therefore should not be construed a limiting the present invention. The terms "first" and "second" are used for descriptive purposes only and are not to be construed as indicating or implying relative importance or implicitly indicating the number of technical features. The meaning of "multiple" is two or more, unless expressly stated otherwise.

Figure 2:
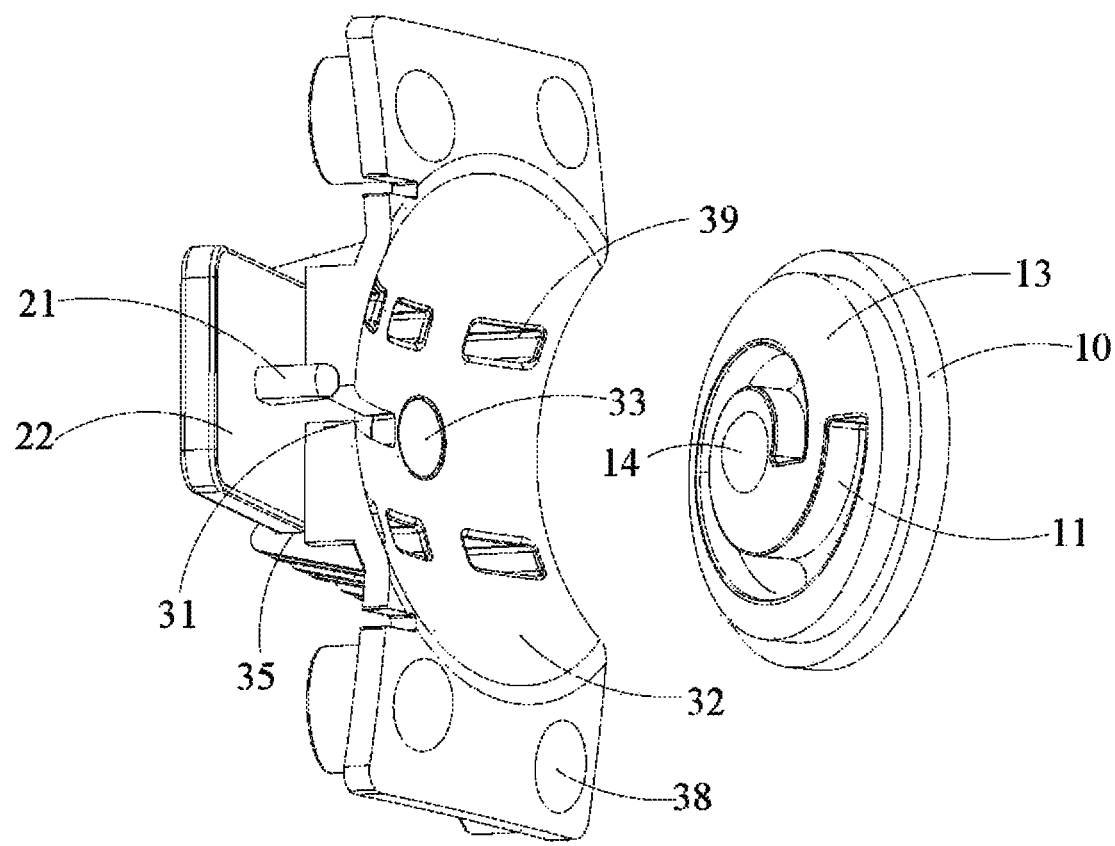
FIG. 2 is an isometric exploded view of the spatial cross-axis transmission mechanism of FIG. 1, with a driving member thereof removed.
Figure 3:
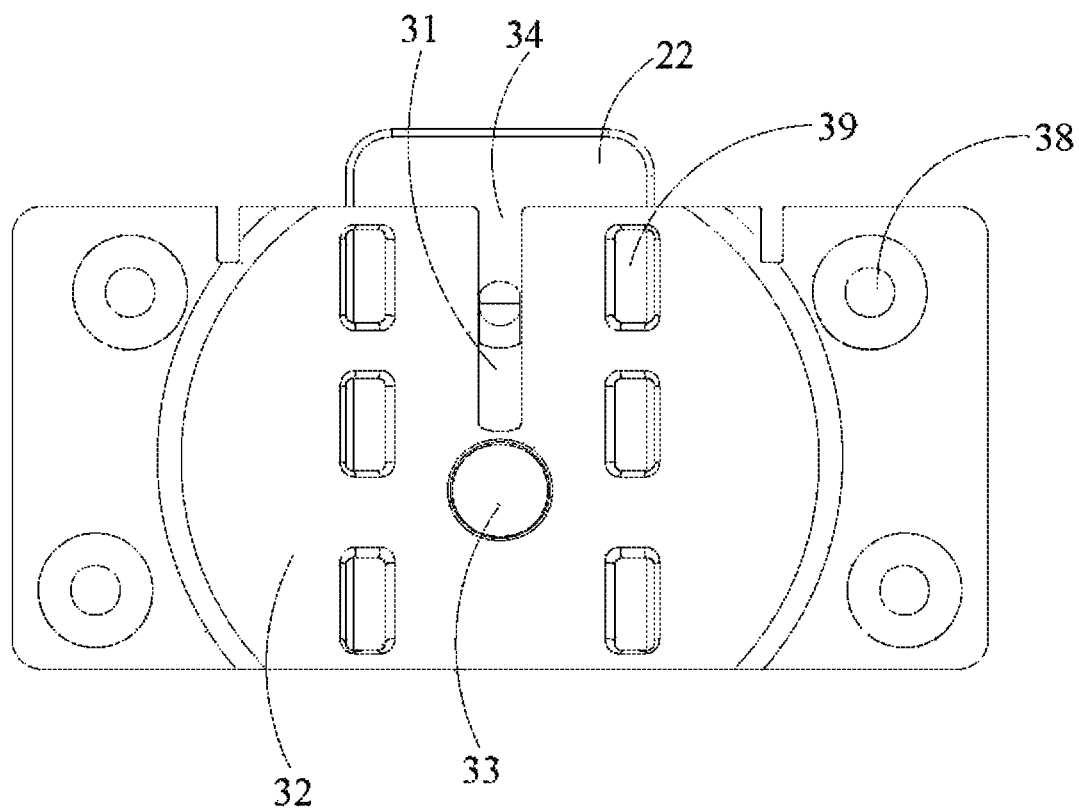
FIG. 3 is a planar view of the spatial cross-axis transmission mechanism of FIG. 1, with a driving member thereof removed.

Referring to FIGS. 1-3, in one embodiment, a spatial crossed axis transmission mechanism includes a rotatable driving member 10, an actuating member 20 driven by the driving member 10 and a support member 30 for fixing the driving member 10 and the actuating member 20. Specifically, the support member 30 is arranged between the driving member 10 and the actuating member 20. The driving member 10 includes a first end surface adjacent to the support member 30 and an Archimedes spiral groove 11 is defined in the first end surface of the driving member 10. The actuating member 20 includes an end surface adjacent to the support member 30 and a sliding shaft 21 on the end surface of the actuating member 20. The support member 30 defines a straight groove 31 passing therethrough, and the sliding shaft 21 has an end that extends through the straight groove 31 and fits into the Archimedes spiral groove 11.

In the embodiment, the rotational motion of the driving member 10 is converted into the linear motion of the actuating member 20 by using the Archimedes spiral groove. The driving member 10 and the actuating member 20 are positioned and fixed by the support member 30, so that the movement of the driving member 10 and the actuating member 20 can be applied to various micromechanical devices through the support member 30. The above-mentioned transmission structure completes the complicated transmission process by using only three parts, which is simple and low in cost, requires less space and has strong practicability.

In the embodiment, the first end surface of the driving member 10 as where the Archimedes spiral groove 11 is defined and an end surface of the support member 30 that abuts against the first end surface of the driving member are both spherical surfaces. With such configuration, the driving member 10 and the support member 30 can be easily demolded when they are made by molding process.

Figure 4:
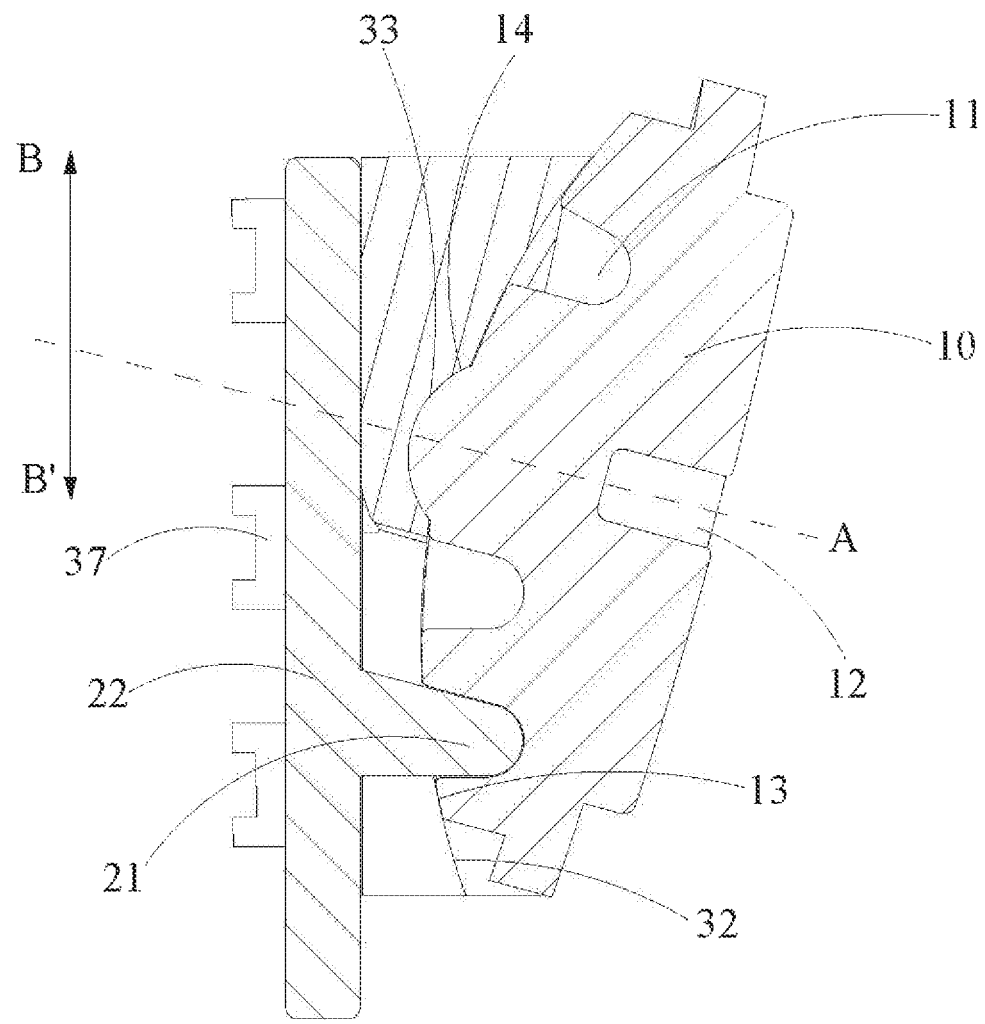
FIG. 4 is a cross sectional view of the spatial cross-axis transmission mechanism of FIG. 1.

Specifically, referring to FIG. 4, the driving member 10 is substantially a round disc with a certain thickness. A shaft hole 12 is defined in a second end surface of the driving member 10 away from the support member 30. The shaft hole 12 allows insertion therein of an external rotating shaft, such as an output shaft of a motor. The support member 30 is plate-shaped. In the embodiment, the first end surface includes a first spherical surface 13 and a third spherical surface 14. The end surface of the support member 30 includes a second spherical surface 32 abutting against the first spherical surface 13 and a fourth spherical surface 33 abutting against the second spherical surface 14. The first spherical surface 13 and the third spherical surface 14 share a first center, the third spherical surface 32 and the fourth spherical surface 33 share a second center. The first center and the second center do not coincide and are located at an axis A of the shaft hole 12. With such configuration, when driven by the external rotating shaft inserted into the shaft hole 12, the driving member 10 rotates about the axis of the shaft hole 12, and due to the limitation of the two pairs of matching spherical surfaces, the driving member 10 can only rotate about the axis. The Archimedes spiral groove 11 rotates as the driving member 10 rotates. Since one end of the sliding shaft 21 is fit in the Archimedes spiral groove 11, the rotation of the Archimedes spiral groove 11 drives the actuating member 20 to move back and forth along the straight groove 31 in a direction as indicated by the arrow B or B'. It should be noted that the moving direction of the actuating member 20 and the axis A that the driving member 10 rotates about are not perpendicular to each other, and that the transmission mechanism can normally operate under the condition that the moving direction of the actuating member 20 and the axis A that the driving member 10 rotates about are crossed with and not perpendicular to each other.

In the embodiment, the first spherical surface 13 is convex and the Archimedes spiral groove 11 is defined in the first spherical surface 13, and the second spherical surface 32 is concave.

In the embodiment, the third spherical surface 14 is convex and joins the first spherical surface 13 at a central region thereof, and the fourth spherical surface 33 is concave and recessed in a central region of the second spherical surface 32.

Figure 5:
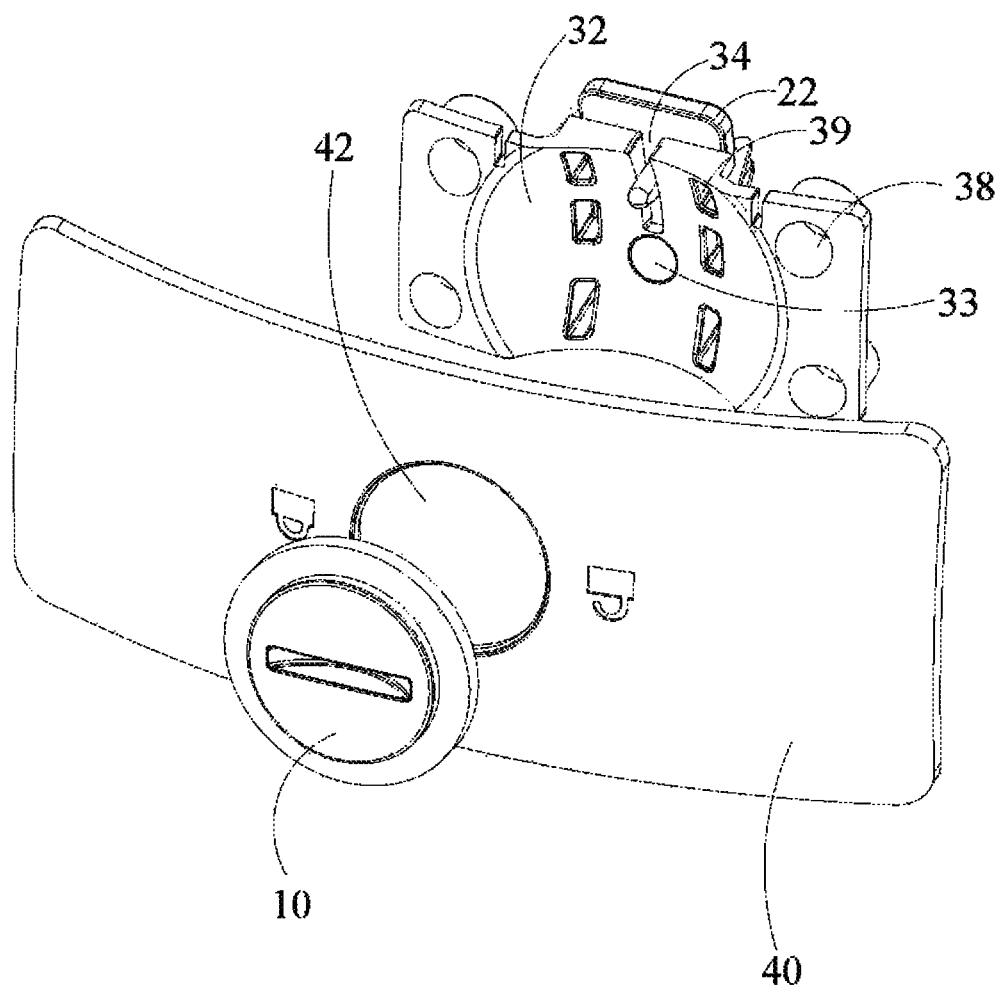
FIG. 5 is an isometric exploded view of an assembly including the spatial cross-axis transmission mechanism of FIG. 1 and a plate.
Figure 6:
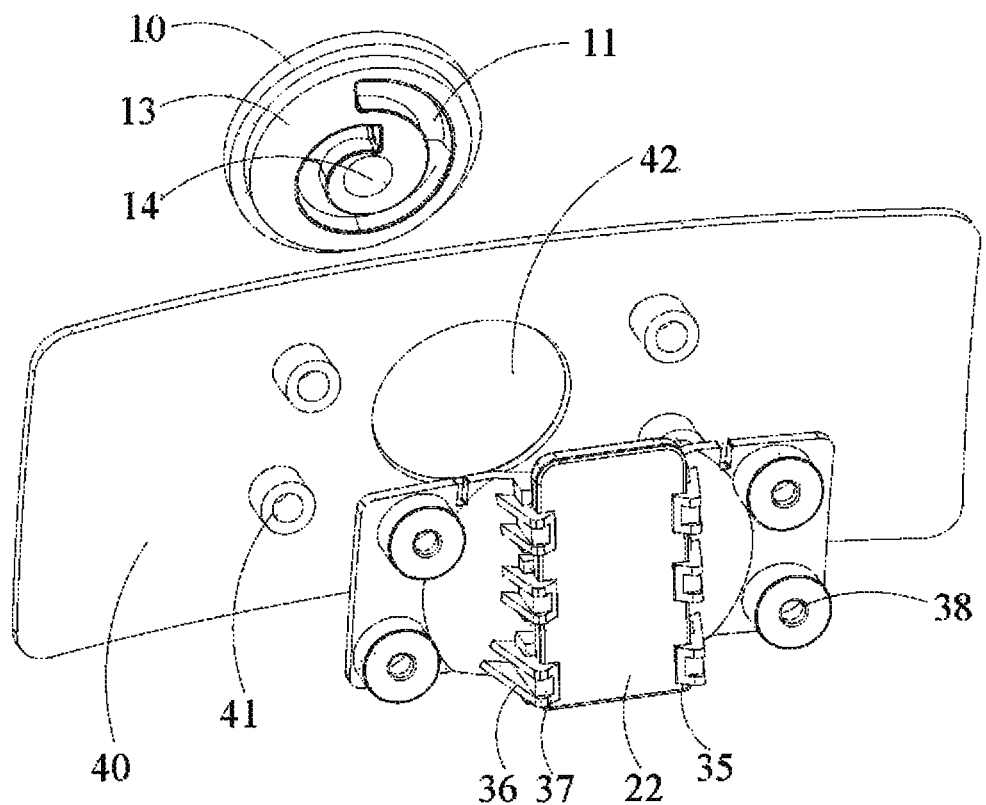
FIG. 6 is an isometric exploded view of the assembly of FIG. 5, viewed from another perspective.

Referring to FIGS. 5 and 6, in one embodiment, the actuating member 20 includes a main plate 22 having an inner side where the sliding shaft 21 is protruded. The straight groove 31 is an open-ended groove that extends from one side of the support member 30 toward a center of the support member 30, which forms an opening 34. The support member 30 includes an end surface facing the actuating member 20 and defines a receiving space 35 for receiving the main plate 22 therein. During assembling, the main plate 22 is pushed into the receiving space 35 with the sliding shaft 21 is pushed into the straight groove 31 through the opening 34, which conveniently connects the actuating member 20 to the support member 30.

In the embodiment, the support member 30 includes two rows of guiding members 36 protruding from the end surface facing the actuating member 20. Each row includes three guiding members 36 that are spaced apart from one another. The guiding members 36 corporately define the receiving space 35. Each guiding member comprises a main body protruding from the end surface facing the actuating member 20 and a hook portion 37 protruding from one end of the main body. The hook portion presses against the main plate 22 so as to prevent the main plate 22 from disengaging from the receiving space 35.

In the embodiment, the support member 30 further defines a number of mounting holes 38 adjacent to edges thereof. The mounting holes 38 allows the support member 30 to be fixed to an external structure so as to indirectly connect driving member 10 and the actuating member 20 to the external structure. In the embodiment as shown in FIGS. 5 and 6, the support member 30 is fixed to a panel 41 having a number of mounting posts 41. The mounting posts 41 are respectively fit into the mounting holes 38, thereby connecting the support member 30 to the panel 40. The panel 40 defines a through hole 42 in a center thereof, through which the driving member 10 passes so that it can be connected to the support member 30 and the actuating member 20.

Referring to FIG. 5, in the embodiment, the support member 30 defines a plurality of slots 39 in the second spherical surface 32 and are symmetric with respect to the straight groove 31. The provision of the slots 39 facilitates the demolding of the molded support member 30.

A robot according to one embodiment of the present disclosure includes a spatial cross-axis transmission mechanism as described above. The above-mentioned transmission structure can complete the complicated transmission process by using only three parts, which is simple, compact, efficient and low in cost, requires less space and has strong practicability. It should be noted that the spatial cross-axis transmission mechanism is not limited to be used in robots and may also be used in other devices.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A spatial crossed-axis transmission mechanism, comprising: a rotatable driving member, an actuating member, and a support member for fixing the driving member and the actuating member;
    wherein the driving member comprises a first end surface adjacent to the support member, an Archimedes spiral groove is defined in the first end surface of the driving member, the actuating member comprises an end surface adjacent to the support member and a sliding shaft on the end surface of the actuating member, the support member defines a straight groove passing therethrough, and the sliding shaft comprises an end that extends through the straight groove and fits into the Archimedes spiral groove.

2. The spatial crossed-axis transmission mechanism according to claim 1, wherein the first end surface of the driving member where the Archimedes spiral groove is defined and an end surface of the support member that abuts against the first end surface of the driving member are both spherical surfaces.

3. The spatial crossed-axis transmission mechanism according to claim 2, wherein the driving member further comprises a second end surface away from the support member, the second end surface defines a shaft hole that allow insertion therein of an external rotating shaft, the first end surface comprises a first spherical surface and a third spherical surface, the end surface of the support member comprises a second spherical surface abutting against the first spherical surface and a fourth spherical surface abutting against the second spherical surface, the first spherical surface and the third spherical surface share a first center, the third spherical surface and the fourth spherical surface share a second center, and the first center and the second center do not coincide and are located at an axis of the shaft hole.

4. The spatial crossed-axis transmission mechanism according to claim 3, wherein the first spherical surface is convex and the Archimedes spiral groove is defined in the first spherical surface, and the second spherical surface is concave.

5. The spatial crossed-axis transmission mechanism according to claim 4, wherein the third spherical surface is convex and joins the first spherical surface at a central region thereof, and the fourth spherical surface is concave.

6. The spatial crossed-axis transmission mechanism according to claim 1, wherein the actuating member comprises a main plate having an inner side where the sliding shaft is located, the straight groove is an open-ended groove that extends from one side of the support member toward a center of the support member, the support member comprises an end surface facing the actuating member and defining a receiving space for receiving the main plate therein.

7. The spatial crossed-axis transmission mechanism according to claim 6, wherein the support member comprises two rows of guiding members protruding from the end surface facing the actuating member, the guiding members corporately define the receiving space, each guiding member comprises a main body protruding from the end surface facing the actuating member and a hook portion protruding from one end of the main body, and the hook portion is configured to prevent the main plate from disengaging from the receiving space.

8. The spatial crossed-axis transmission mechanism according to claim 6, wherein the support member further defines a plurality of mounting holes allowing the support member to be fixed to an external structure.

9. The spatial crossed-axis transmission mechanism according to claim 4, wherein the support member defines a plurality of slots in the second spherical surface and are symmetric with respect to the straight groove.

10. A robot comprising a spatial crossed-axis transmission mechanism, the transmission mechanism comprising: a rotatable driving member, an actuating member, and a support member for fixing the driving member and the actuating member;

wherein the driving member comprises a first end surface adjacent to the support member, the Archimedes spiral groove is defined in the first end surface of the driving member, the actuating member comprises an end surface adjacent to the support member and a sliding shaft on the end surface of the actuating member, the support member defines a straight groove passing therethrough, and the sliding shaft comprises an end that extends through the straight groove and fits into the Archimedes spiral groove.

* * * * *